United States Patent
Itoh et al.

(10) Patent No.: US 9,156,953 B2
(45) Date of Patent: Oct. 13, 2015

(54) POLYGLYCOLIC ACID RESIN COMPOSITION AND MOLDED ARTICLE THEREFROM

(75) Inventors: Daisuke Itoh, Tokyo (JP); Naoko Tohmiya, Tokyo (JP)

(73) Assignee: KUREHA CORPORATION, Tokyo (JP)

( * ) Notice: Subject to any disclaimer, the term of this patent is extended or adjusted under 35 U.S.C. 154(b) by 502 days.

(21) Appl. No.: 13/121,216

(22) PCT Filed: Jul. 27, 2009

(86) PCT No.: PCT/JP2009/063334
§ 371 (c)(1),
(2), (4) Date: Mar. 28, 2011

(87) PCT Pub. No.: WO2010/038537
PCT Pub. Date: Apr. 8, 2010

(65) Prior Publication Data
US 2011/0190456 A1    Aug. 4, 2011

(30) Foreign Application Priority Data
Sep. 30, 2008    (JP) .................................. 2008-254229

(51) Int. Cl.
| | |
|---|---|
| C08G 63/06 | (2006.01) |
| C08G 63/08 | (2006.01) |
| C08J 3/00 | (2006.01) |
| C08L 67/04 | (2006.01) |
| C08G 63/02 | (2006.01) |

(Continued)

(52) U.S. Cl.
CPC ................ *C08J 3/005* (2013.01); *C08L 67/04* (2013.01); *C08G 63/02* (2013.01); *C08G 63/06* (2013.01);

(Continued)

(58) Field of Classification Search
CPC ........ C08G 63/02; C08G 63/06; C08G 63/08; C08G 2230/00; C08L 67/04; C08L 2205/02; C08L 2205/025; C08L 2666/18
USPC .......... 524/117, 120, 127, 128, 539, 271, 354
See application file for complete search history.

(56) References Cited

U.S. PATENT DOCUMENTS 4,889,119 A * 12/1989 Jamiolkowski et al. ...... 606/220
5,853,639 A    12/1998 Kawakami et al.

(Continued)

FOREIGN PATENT DOCUMENTS

| | | |
|---|---|---|
| JP | 09-111107 | 4/1997 |
| JP | 09-157408 | 6/1997 |

(Continued)

OTHER PUBLICATIONS

Wuisman, P. I. J. M., et al., Eur. Spine J., Feb. 2006, 15(2): 133-148.*

(Continued)

*Primary Examiner* — Richard A Huhn
(74) *Attorney, Agent, or Firm* — Birch, Stewart, Kolasch & Birch, LLP

(57) ABSTRACT

To provide polyglycolic acid resin compositions having excellent moldability, and high barrier properties and transparency after molding, and molded articles therefrom. According to the present invention, a polylactic acid having a mass average molecular weight Mw of 100000 to 1000000 is added to a polyglycolic acid having a mass average molecular weight Mw of 100000 to 1000000 in a content of the polylactic acid of 5 to 30% by mass, and the mixture is melt-kneaded under, for example, a temperature condition of 230 to 270° C., thereby obtaining a resin composition having a temperature-lowering crystallization peak temperature Tc, measured by differential scanning calorimetry, of 3 to 18° C. lower than that of a polyglycolic acid only.

5 Claims, 1 Drawing Sheet

(52) U.S. Cl.
CPC ............ *C08G 63/08* (2013.01); *C08G 2230/00* (2013.01); *C08J 2300/16* (2013.01); *C08J 2367/04* (2013.01); *C08L 2205/02* (2013.01); *C08L 2205/025* (2013.01); *C08L 2666/18* (2013.01)

(56) References Cited

U.S. PATENT DOCUMENTS

| | | | |
|---|---|---|---|
| 6,420,027 B2 * | 7/2002 | Kimura et al. | 428/373 |
| 7,067,611 B2 * | 6/2006 | Yamane et al. | 528/354 |
| 8,003,721 B2 * | 8/2011 | Suzuki et al. | 524/117 |
| 2009/0275692 A1 | 11/2009 | Suzuki et al. | |

FOREIGN PATENT DOCUMENTS

| | | |
|---|---|---|
| JP | 10-060136 | 3/1998 |
| JP | 2002-226689 | 8/2002 |
| JP | 2002-226691 | 8/2002 |
| JP | 2004-083627 | 3/2004 |
| JP | 2006-130847 | 5/2006 |
| JP | 2006-168375 | 6/2006 |
| WO | 2008004490 | 1/2008 |

OTHER PUBLICATIONS

International Search Report PCT/JP2009/063334 mailed Sep. 29, 2009.

* cited by examiner

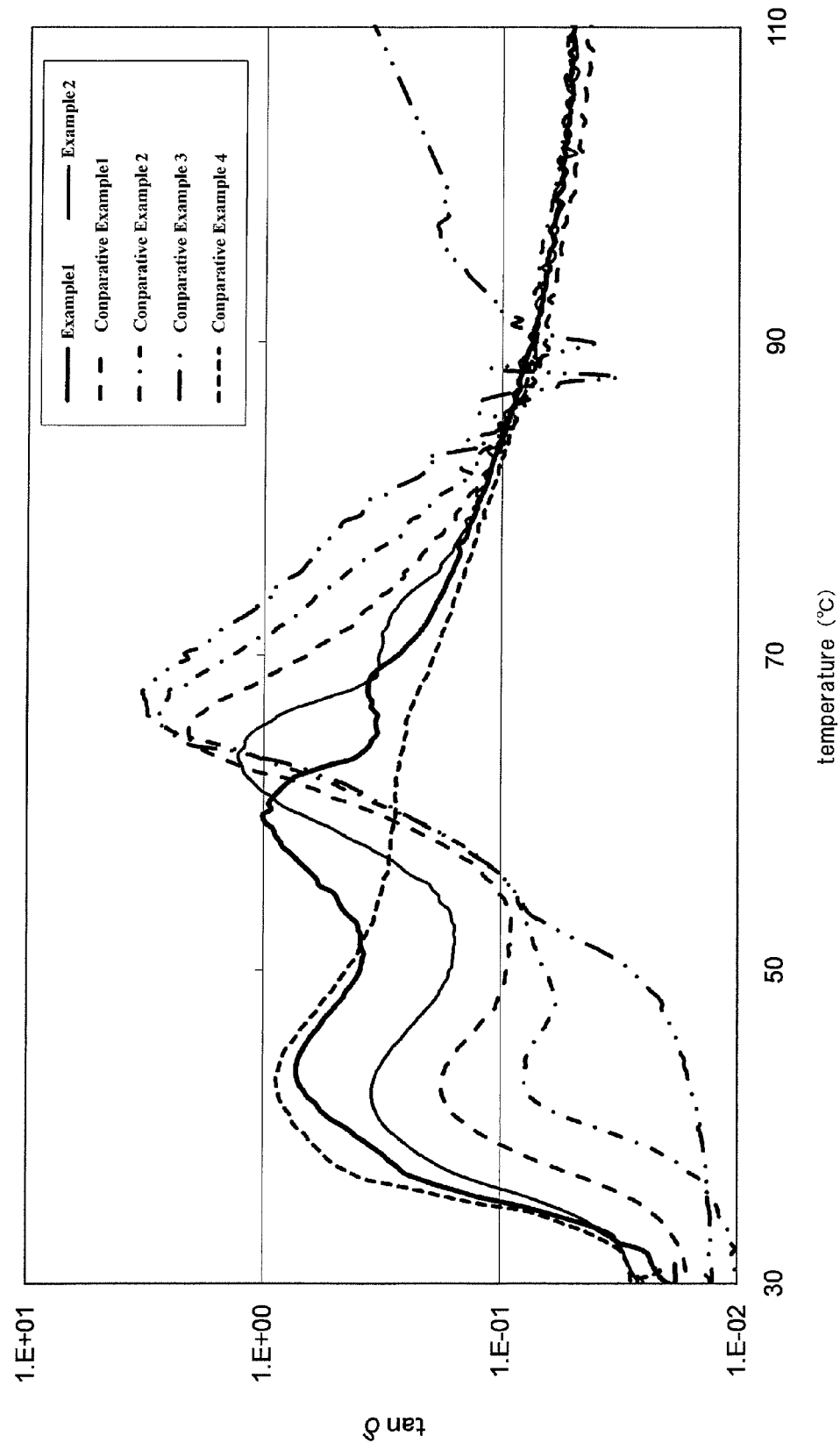

US 9,156,953 B2

POLYGLYCOLIC ACID RESIN COMPOSITION AND MOLDED ARTICLE THEREFROM

TECHNICAL FIELD

The present invention relates to polyglycolic acid resin compositions containing polylactic acid, and molded articles therefrom. More particularly, the present invention relates to a technique regarding biodegradable resin compositions, and articles obtained by molding those compositions.

BACKGROUND ART

Recently, development of bottles, containers, sheets, and films using a biodegradable resin has been progressed in resin molded articles for use in food products, from a purpose of environmental loading reduction. The biodegradable resins usable for this application include polylactic acid, but there is a problem that polylactic acid resin is lower in various physical properties than resins which have been conventionally used. Thus, polylactic acid resin sheets having improved sliding property, impact resistance, or heat resistance by adding a biodegradable aliphatic polyester to the polylactic acid polymer, are proposed (See, Patent Documents 1 to 3).

For example, a film described in Patent Document 1 is obtained by adding a biodegradable aliphatic polyester having a glass transition temperature of 0° C. or less to a polylactic acid polymer to improve the impact resistance. In a sheet described in Patent Document 2, the improvement of the sliding property is attempted by adding a biodegradable aliphatic polyester having a glass transition temperature of 0° C. or less to a polylactic acid polymer having a composition ratio of L-lactic acid and D-lactic acid of 100:0 to 94:6 or 6:94 to 0:100 in a predetermined mixing ratio; at least uniaxially stretching the resin mixture; and subjecting it to a heat-treatment.

In addition, according to a method for molding a biodegradable sheet described in Patent Document 3, to a polylactic acid resin is added a polyester having a glass transition temperature of 0° C. or less and a melting point higher than a glass transition temperature of the polylactic acid resin and lower than a melting point of the polylactic acid resin in an predetermined mixing ratio. Then, a sheet composed of such a composition is pre-crystallized by bringing the sheet into contact with a cast roll, and molded at a temperature of the melting point of the aliphatic polyester or more, and less than the melting point of the polylactic acid resin, thereby improving the heat resistance of the sheet.

On the other hand, polylactic acid resin molded articles have the defect of having very poor barrier properties against a gas such as oxygen or carbon dioxide, and steam. Specifically, an oxygen-permeability of a polylactic acid film is about 5 times lower than those of aromatic polyester films which have been conventionally used, at 23° C. under a relative humidity of 80%, and a steam-barrier property thereof is about 10 times lower at 40° C. under a relative humidity of 90%. It is difficult to apply the molded articles having poor barrier properties as described above to materials for wrapping food and containers for cosmetics, and therefore, their possible applications are limited.

For imparting the barrier properties to the polylactic acid resin molded article, for example, a method in which a resin having a good barrier property such as an ethylene-vinyl alcohol copolymer is laminated therewith can be considered. Such a barrier material, however, has the defect of having poor biodegradability. Therefore, a multi-layer film in which polyglycolic acid having biodegradability is used as a barrier material has hitherto been proposed (see, Patent Document 4). The multi-layer film described in Patent Document 4 is a polyglycolic acid film on which a polylactic acid film(s) is/are directly laminated on its one or both surfaces, which is formed by co-extruding the polyglycolic acid and the polylactic acid to obtain a multi-layer sheet, and biaxially stretching the sheet under pre-determined conditions.

CITATION LIST

Patent Document

[Patent Document 1] Japanese Unexamined Patent Application Publication No. 9-111107
[Patent Document 2] Japanese Unexamined Patent Application Publication No. 9-157408
[Patent Document 3] Japanese Unexamined Patent Application Publication No. 2006-168375
[Patent Document 4] Japanese Unexamined Patent Application Publication No. 2006-130847

DISCLOSURE OF THE INVENTION

Technical Problems to be Solved

The conventional techniques described above, however, have the defects as shown below. That is, the resins in which the biodegradable aliphatic polyester having a glass transition temperature of 0° C. or less is added to the polylactic acid polymer, as described in Patent Documents 1 to 3, have a defect in which the barrier properties against a gas such as oxygen or carbon dioxide and steam are not improved, though their flexibility and moldability are more improved compared to those of a resin composed only of the polylactic acid polymer. For that reason, the resins described in Patent Documents 1 to 3 have very poor barrier properties against gas and steam, and the articles molded therefrom cannot be used as a barrier material.

When the polylactic acid and the polyglycolic acid are co-extruded into a sheet, as a technique described in Patent Document 4, amorphous sheets having excellent transparency can be easily obtained; however, when the sheet is processed into a container, for example, problems arise, such as a break in a layer composed of the polyglycolic acid, and cloudiness of a layer composed of the polylactic acid. In addition, when a draw ratio is high during processing, form defection may happen, and also when bottles are formed from pre-forms in bottle-molding, molding cannot be stably performed. The difference in the optimum molding temperature between the polyglycolic acid and the polylactic acid is considered to cause these defects.

The present invention, therefore, aims mainly at providing polyglycolic acid resin compositions having excellent moldability, and high barrier properties and transparency after molding, and articles molded therefrom.

Means to Solve the Problems

The polyglycolic acid resin composition of the present invention is a polyglycolic acid resin composition containing a product melt-kneaded from a polylactic acid and a polyglycolic acid; the composition has 5 to 30% by mass of the polylactic acid; both the polylactic acid and the polyglycolic acid have a mass average molecular weight Mw of 100000 to 1000000; and the composition has a temperature-lowering crystallization peak temperature Tc, measured by differential scanning calorimetry, of 3 to 18° C. lower than that of a polyglycolic acid only.

In the present invention, the moldability and transparency thereof can be improved while the gas-barrier property of the polyglycolic acid is maintained, because the temperature-lowering crystallization peak temperature Tc, measured by differential scanning calorimetry, is adjusted to a temperature 3 to 18° C. lower than that of the polyglycolic acid only by adding a specific amount of the polylactic acid to the polyglycolic acid.

This polyglycolic acid resin composition can be obtained by kneading the polylactic acid with the polyglycolic acid under a temperature condition of, for example, 230 to 270° C.

The polyglycolic acid resin molded article of the present invention is an article obtained by molding the polyglycolic acid resin composition described above, which has a temperature-lowering crystallization peak temperature Tc, measured by differential scanning calorimetry, of 5° C. or more lower than that of an article molded from a polyglycolic acid only.

In the present invention, the moldability and transparency can be improved without decreasing the gas-barrier property of the polyglycolic acid, because the temperature-lowering crystallization peak temperature Tc, measured by differential scanning calorimetry, is adjusted to a temperature 5° C. or more lower than that of an article molded from polyglycolic acid only by using the resin composition in which a specific amount of the polylactic acid is added to the polyglycolic acid.

This resin molded article desirably has a decrease percentage D of the main dispersion peak temperature in a dynamic viscoelasticity measurement, calculated from the following equation 1, of more than 4%. In the equation 1, $T_{PGA}$ is a main dispersion peak temperature of the polyglycolic acid resin molded article of the present invention, and $T_{PLA}$ is a main dispersion peak temperature of a molded article composed of polylactic acid only.

$$D(\%) = \frac{T_{PLA} - T_{PGA}}{T_{PLA}} \times 100 \quad [\text{Eq. 1}]$$

Also, the polyglycolic acid resin molded article of the present invention preferably has an elongation at the breaking point of 100 to 600% in a stress-strain measurement at 75° C.

On the other hand, the molded article of the present invention has a layer composed of the polyglycolic acid resin composition described above. In the present invention, excellent gas-barrier property, moldability, and transparency can all be obtained in the molded article because the layer composed of the resin composition in which a specific amount of the polylactic acid is added to the polyglycolic acid is laminated.

Effect of the Invention

According to the present invention, molded articles having excellent moldability, and high barrier properties and transparency after molding can be obtained by adding a specific amount of the polylactic acid to the polyglycolic acid, and adjusting the temperature-lowering crystallization peak temperature Tc, measured by differential scanning calorimetry, to a specific range.

BRIEF DESCRIPTION OF DRAWING

FIG. 1 is a graph showing main dispersion peak temperatures of samples of Examples and Comparative Examples in a dynamic viscoelasticity measurement, wherein a horizontal axis shows temperatures and a vertical axis shows tan δ.

BEST MODE FOR CARRYING OUT THE INVENTION

Embodiments for carrying out the present invention will be explained in detail below. First, a polyglycolic acid resin composition according to a first embodiment of the present invention (hereinafter also referred to only as a "resin composition") will be explained. The resin composition of the present embodiment is a product obtained by adding 5 to 30% by mass of a polylactic acid (hereinafter referred to as "PLA" for short) having a mass average molecular weight Mw of 100000 to 1000000 to a polyglycolic acid (hereinafter referred to as "PGA" for short) having a mass average molecular weight Mw of 100000 to 1000000, and melt-kneading the mixture.

The PGA used in the resin composition of the present embodiment is a homopolymer or copolymer containing glycolic acid repeating units having the formula: —(O—CH$_2$—CO)—, and is a biodegradable material capable of being decomposed by microorganisms or enzymes existing in nature such as soil or sea water. The PGA also has excellent gas-barrier properties such as oxygen gas-barrier property, carbon dioxide gas-barrier property, and steam-barrier property, and high heat resistance and mechanical strength.

However, when PGA has a mass average molecular weight Mw of less than 100000, it is difficult to perform extrusions such as pelletization, sheet-molding, and bottle-molding, because of the low viscosity of the resin composition thereof. On the other hand, when PGA has a mass average molecular weight Mw of more than 1000000, the viscosity of the PGA is so high that the melt-kneading with PLA becomes difficult. In the resin composition of the present embodiment, therefore, the PGA having a mass average molecular weight Mw of 10 to 1000000 is used. The PGA preferably has a mass average molecular weight Mw of 10 to 500000.

In the resin composition of the present embodiment, a biodegradable material, the PLA, is added to the PGA described above, and the mixture is melt-kneaded under predetermined conditions, thereby improving the moldability and the transparency without decreasing the gas-barrier property of the PGA. At that time, when the PLA amount is less than 5% by mass in the resin composition, the addition effect of the PLA cannot be obtained, and therefore the moldability cannot be sufficiently improved. On the other hand, when the PLA amount is more than 30% by mass in resin composition, the transparency and the barrier properties of the molded article are lowered. The amount of PLA added is, therefore, from 5 to 30% by mass to the total mass of the resin composition.

When the PLA used has a mass average molecular weight Mw of less than 100000, the viscosity of the resin composition is low, thus resulting in difficulty of extrusion. On the other hand, when the PLA has a mass average molecular weight Mw of more than 1000000, the melt-kneading with the PGA becomes difficult. In the resin composition of the present embodiment, therefore, the PLA having a mass average molecular weight Mw of 10 to 1000000 is used. The mass average molecular weight Mw of the PLA is preferably from 10 to 500000.

A temperature at which the PGA and the PLA are melt-kneaded is preferably from 230 to 270° C. When the kneading temperature is less than 230° C., the mixture may be unstably extruded, because the kneading temperature is near or lower than the melting point of the PGA. On the other hand, when the melt-kneading temperature is more than 270° C., the PLA may be decomposed during the kneading. The kneading time of the PGA and the PLA can be set appropriately depending on the performance of a device, and the like. For example, if the kneading temperature is within a range described above, the mixture may be kneaded for about 1 to 15 minutes.

In the present embodiment, the resin composition has a temperature-lowering crystallization peak temperature Tc of 3 to 18° C. lower than that of a PGA only, which is measured in accordance with differential scanning calorimetry (DSC) when the temperature is elevated at a rate of 20° C./minute from 30° C., it is kept at 270° C. for 5 minutes, and then it is lowered at a rate of 20° C./minutes. The temperature-lowering crystallization peak temperature Tc of the resin composition of the present embodiment is a value derived from the PGA, and when the value of the composition is made lower than that of the PGA only, the crystallinity of the PGA is lowered, and the processability is improved when the composition is molded into a sheet or a bottle.

Even if the temperature-lowering crystallization peak temperature Tc is lower than that of the PGA only, however, when the difference between them is less than 3° C., the effect of sufficiently improving the mold-processability cannot be obtained. On the other hand, the difference in the temperature-lowering crystallization peak temperature Tc is more than 18° C., the barrier properties of the molded article are remarkably decreased and the transparency is also decreased. For that reason, the temperature-lowering crystallization peak temperature Tc of the resin composition of the present embodiment is 3 to 18° C. lower than that of the PGA only.

As described above, in the polyglycolic acid resin composition of the present embodiment, 5 to 30% by mass of the PLA is added to the PGA, and the temperature-lowering crystallization peak temperature Tc, measured by the differential scanning calorimetry, is set to a temperature 3 to 18° C. lower than that of the polyglycolic acid only. As a result, the moldability and the transparency can be more improved than those of the PGA only, without decreasing the gas-barrier property of the PGA. In addition, in the resin composition of the present embodiment, the PGA and the PLA, both of which have a mass average molecular weight Mw of 10 to 500000 are used, and therefore commercially available products can be used as they are.

Next, a polyglycolic acid resin molded article according to a second embodiment of the present invention (hereinafter also referred to only as a "resin molded article") will be explained. The resin molded article of the present embodiment is molded from the resin composition of the first embodiment described above, and examples thereof including products of various shapes such as films, sheets, blow-molded containers, bottles, trays, cups, lids, bag-shaped containers, and cylindrical wrapping materials.

The resin molded article of the present embodiment has a temperature-lowering crystallization peak temperature Tc of 5° C. or more lower than the temperature-lowering crystallization peak temperature of the article molded from the PGA only, when measured in accordance with the DSC when the temperature is elevated at a rate of 20° C./minute from 30° C., it is kept at 270° C. for 5 minutes, and then it is lowered at a rate of 20° C./minute to 30° C. As described above, when the temperature-lowering crystallization peak temperature Tc, measured by the DSC, is set to a temperature lower than that of the article molded from the PGA only, the crystallization of the PGA in the resin composition hardly occurs, and therefore the processability is improved. However, even if the temperature-lowering crystallization peak temperature Tc is lower than that of the article molded from the PGA only, when the difference between them is less than 5° C., the effect of sufficiently improving the processability cannot be obtained. For that reason, the temperature-lowering crystallization peak temperature Tc of the resin molded article of the present embodiment is set to a temperature 5° C. or more lower than that of the article molded from the PGA only.

In addition, the resin molded article of the present embodiment desirably has a decrease percentage D of a main dispersion peak temperature in a dynamic viscoelasticity measurement, calculated by the following equation 2, of more than 4%. In the following equation 2, $T_{PGA}$ shows a main dispersion peak temperature obtained when a dynamic viscoelasticity of the resin molded article of the present embodiment is measured at a measuring frequency of 10 Hz and at a rate of temperature rise of 2° C./minute, and $T_{PLA}$ shows a main dispersion peak temperature obtained when a dynamic viscoelasticity of a article molded from the PLA only is measured under the same conditions as above.

$$D(\%) = \frac{T_{PLA} - T_{PGA}}{T_{PLA}} \times 100 \qquad [\text{Eq. 2}]$$

The main dispersion peak temperature $T_{PGA}$, obtained when the dynamic viscoelasticity of the resin molded article of the present embodiment is measured, is a value derived from the PLA. When the main dispersion peak temperature $T_{PGA}$ is set so that the decrease percentage D against the value ($T_{PLA}$) of the article molded from the PLA only obtained from the equation 2 described above exceeds 4%, the mobility of the PLA is reduced, and the mold-processability can be improved.

The resin molded article of the present embodiment can be obtained, for example, by extruding the resin composition of the first embodiment described above at a temperature of 230 to 250° C. into a resin sheet with a thickness of 5 to 1000 μm, and biaxially stretching the resulting resin sheet at a temperature of 45 to 140° C. At that time, when the extrusion temperature is less than 230° C., the extrusion property may be unstable. On the other hand, when the extrusion temperature is more than 250° C., the PLA may be decomposed during the molding process, and the water-resistance of the molded article may also be decreased, due to the increase of the number of terminal groups of the PLA caused by the decomposition. Therefore, the temperature at which the resin sheet is extruded is preferably from 230 to 250° C. In a case in which a resin molded article is formed by extrusion, not biaxially stretching, as described below, the molding temperature is also desirably from 230 to 250° C.

When the resin sheet described above is biaxially stretched at a temperature of less than 45° C., the resin sheet is not sufficiently softened, and may be broken. On the other hand, when the stretching temperature is more than 140° C., the PGA contained in the resin composition is crystallized, and the transparency may be decreased. Therefore, when the resin molded article of the present embodiment is biaxially stretched, the molding temperature is preferably from 45 to 140° C.

In addition, the resin molded article of the present embodiment has an elongation at the breaking point of preferably 100 to 600%, more preferably 300 to 600%, when the stress-strain measurement is performed at a temperature of 75° C. and a tension rate of 500 mm/minute. In this way, the moldability of the resin composition or the resin sheet into containers, for example, can be improved, and the process window at bottle-molding widens.

As described above, because the resin molded article of the present embodiment uses the resin composition in which 5 to 30% by mass of the PLA is added to the PGA, and has the temperature-lowering crystallization peak temperature Tc, measured by the differential scanning calorimetry, of 5° C. or more lower than that of the polyglycolic acid only, the moldability and the transparency can be more improved than those of the article molded from the PGA only, without decreasing the gas-barrier property of the PGA.

Next, a molded article according to a third embodiment of the present invention will be explained. The resin molded article of the present embodiment is a laminated product containing multiple layers composed of different resins, in which at least one of the multiple layers is a layer formed from the resin composition of the first embodiment described above. The molded article of the present embodiment can be obtained, for example, by laminating a polyglycolic acid resin layer composed of the resin composition of the first embodiment described above with a layer composed of the PLA (hereinafter referred to as a "PLA layer").

The laminate of the layer composed of the resin in which the PLA is added to the PGA (the polyglycolic acid resin layer) and the PLA layer can be formed into a molded article having more improved stretchability than that of a laminate of a layer composed only of the PGA (hereinafter referred to as a "PGA layer") and the PLA layer, and high transparency and barrier properties. Specifically, a container having a three-layer structure in which the PLA layer, the PGA layer, and the PLA layer are laminated in this order, has a poor appearance such as a whitened PGA layer due to excessive stretching during mold-processing, but the laminate composed of the PLA layer and the polyglycolic acid resin layer formed from the resin composition of the first embodiment does not have such a defect.

As described above, because the molded article of the present embodiment has the layer molded from the resin composition in which 5 to 30% by mass of the PLA is added to the PGA (the polyglycolic acid resin layer), all of the gas-barrier property, the moldability, and the transparency are excellent.

EXAMPLES

The effects of the present invention will be explained in detail by means of Examples of the present invention and Comparative Examples. In the present Examples, resin compositions having a different mixing ratio of PGA and PLA were produced, and their temperature-lowering crystallization peak temperatures were measured. Also, an article molded from each resin composition was produced, then its temperature-lowering crystallization peak temperature, its main dispersion peak temperature in a dynamic viscoelasticity measurement, and its elongation at the breaking point were measured, and its oxygen-permeability, steam-permeability, and its cloudiness were evaluated.

Example 1

Ninety parts by mass of pellets composed of PGA having a mass average molecular weight Mw of 220000 (a viscosity: 800 Pa·s at 270° C. and at a shear rate of 122 sec$^{-1}$), and 10 parts by mass of pellets composed of PLA having a mass average molecular weight Mw of 230000 (Lacea H-400 manufactured by Nature Works LLC) were melt-kneaded at 240° C. through an extruder and strand dies to form pellets composed of the resin composition of Example 1. The temperature-lowering crystallization peak temperature Tc thereof was measured in accordance with DSC.

Next, the pellets of Example 1 were molded at a molding temperature of 240° C. through an extruder and a T-die into a sheet with a thickness of 100 μm. Then the elongation at the breaking point obtained by a stress-strain curve measurement, the main dispersion peak temperature in a dynamic viscoelasticity, the temperature-lowering crystallization peak temperature Tc in accordance with DSC, and the cloudiness of the sheet were measured. Further, this sheet was simultaneously biaxially stretched at a tension rate of 10 m/minute and at a draw ratio of 4×4 using a biaxially stretching tester X6H-S manufactured by Toyo Seiki Seisaku-Sho Ltd. to form a biaxially stretched film. The oxygen-permeability and the steam-permeability of this biaxially stretched film were measured.

Example 2

Pellets composed of a resin composition of Example 2 were produced in the same manner and under the same conditions as in Example 1, except that the PGA was added in an amount of 75 parts by weight and the PLA was added in an amount of 25 parts by weight. The temperature-lowering crystallization peak temperature Tc thereof was measured in accordance with the DSC. A sheet with a thickness of 100 μm was molded from the pellets of Example 2 in the same manner and under the same conditions as in Example 1. The elongation at the breaking point obtained by the stress-strain curve measurement, the main dispersion peak temperature in the dynamic viscoelasticity, the temperature-lowering crystallization peak temperature Tc in accordance with the DSC, and the cloudiness of the sheet were measured. Further, a film was formed from this sheet in the same manner and under the same conditions as in Example 1, and the oxygen-permeability and the steam-permeability thereof were measured.

Comparative Example 1

Pellets composed of a resin composition of Comparative Example 1 were produced in the same manner and under the same conditions as in Example 1, except that the PGA was added in an amount of 50 parts by weight and the PLA was added in an amount of 50 parts by weight. The temperature-lowering crystallization peak temperature Tc thereof was measured in accordance with the DSC. A sheet with a thickness of 100 μm was molded from the pellets of Comparative Example 1 in the same manner and under the same conditions as in Example 1. The elongation at the breaking point obtained by the stress-strain curve measurement, the main dispersion peak temperature in the dynamic viscoelasticity, the temperature-lowering crystallization peak temperature Tc in accordance with the DSC, and the cloudiness of the sheet were measured. Further, a film was formed from this sheet in the same manner and under the same conditions as in Example 1, and the oxygen-permeability and the steam-permeability thereof were measured.

Comparative Example 2

Pellets composed of a resin composition of Comparative Example 2 were produced in the same manner and under the same conditions as in Example 1, except that the PGA was added in an amount of 25 parts by weight and the PLA was added in an amount of 75 parts by weight. The temperature-lowering crystallization peak temperature Tc thereof was measured in accordance with the DSC. A sheet with a thickness of 100 μm was molded from the pellets of Comparative Example 2 in the same manner and under the same conditions as in Example 1. The elongation at the breaking point obtained by the stress-strain curve measurement, the main dispersion peak temperature in the dynamic viscoelasticity, the temperature-lowering crystallization peak temperature Tc in accordance with the DSC, and the cloudiness of the sheet were measured. Further, a film was formed from this sheet in the same manner and under the same conditions as in Example 1, and the oxygen-permeability and the steam-permeability thereof were measured.

Comparative Example 3

Pellets composed of PGA having a mass average molecular weight Mw of 220000 (a viscosity: 800 Pa·s at 270° C. and at a shear rate of 122 sec$^{-1}$), of Comparative Example 3, were molded at a molding temperature of 240° C. through an extruder and a T-die to form a sheet with a thickness of 100 μm. The elongation at the breaking point obtained by the stress-strain curve measurement, the main dispersion peak temperature in the dynamic viscoelasticity, the temperature-lowering crystallization peak temperature in accordance with the DSC, and the cloudiness of this sheet were measured. This sheet was biaxially stretched in the same manner and under the same conditions as in Example 1 to form a biaxially stretched film. The oxygen-permeability and the steam-permeability thereof were measured. For comparison, the temperature-lowering crystallization peak temperature of the pellets of Comparative Example 3 was also measured in accordance with the DSC.

Comparative Example 4

Pellets composed of PLA having a mass average molecular weight Mw of 220000 (a viscosity: 800 Pa·s at 270° C. and at a shear rate of 122 sec$^{-1}$), of Comparative Example 4, were molded at a molding temperature of 240° C. through an extruder and a T-die to form a sheet with a thickness of 100 μm. The elongation at the breaking point obtained by the stress-strain curve measurement, the main dispersion peak temperature in the dynamic viscoelasticity, the temperature-lowering crystallization peak temperature in accordance with the DSC, and the cloudiness of this sheet were measured. This sheet was biaxially stretched in the same manner and under the same conditions as in Example 1 to form a biaxially stretched film. The oxygen-permeability and the steam-permeability thereof were measured. For comparison, the temperature-lowering crystallization peak temperature of the pellets of Comparative Example 4 was also measured in accordance with the DSC.

Each item was evaluated in accordance with the following method and conditions.

(a) Temperature-Lowering Crystallization Peak Temperature of Resin Composition or Molded Article Using DSC-60 manufactured by Shimadzu Corporation, the temperature of the pellets of each of Examples and Comparative Examples or the sheet molded therefrom was elevated at a rate of 20° C./minute from 30° C., it was kept at 270° C. for 5 minutes, and then it was lowered at a rate of 20° C./minute, and a peak temperature generated in the course of the temperature-lowering was measured.

(b) Elongation at Breaking Point

A relationship between a stress and a strain of a sample having a width of 10 mm, cut from each sheet of Examples and Comparative Examples, was measured by using TENSILON RTM-100 manufactured by A & D Company, Limited at a distance between chucks of 20 mm and at a tension rate of 500 mm/minute under a temperature condition of 75° C. until the sample was broken. From the measurement results, the elongations at the breaking point of the molded articles of Examples and Comparative Examples were obtained.

(c) Main Dispersion Peak Temperature in Dynamic Viscoelasticity

A sample having a length of 1 mm and a width of 25 mm, cut from each sheet of Examples and Comparative Examples, was fixed on a dynamic viscoelasticity apparatus RSA-3 manufactured by TA Instruments, Inc. at a distance between chucks of 22.4 mm, and a dynamic viscoelasticity was measured at a rate of temperature rise of 2° C./minute and at a measuring frequency of 10 Hz. FIG. 1 is a graph showing main dispersion peak temperatures in the dynamic viscoelasticity measurement of each sample of Examples and Comparative Examples, wherein the horizontal axis shows temperatures and the vertical axis shows tan δ. The main dispersion peak derived from the polylactic acid was obtained from the measurement results shown in FIG. 1.

(d) Cloudiness

The maximum draw ratio of a sample having a length of 90 mm and a width of 90 mm, cut from each sheet of Examples and Comparative Examples, was confirmed by simultanuously biaxially stretching the sample at a tension rate of 10 m/minute while increasing a draw ratio in both directions from 3.0×3.0 to 4.5×4.5 by 0.5 each, using a biaxially stretching test apparatus X6H-S manufactured by Toyo Seiki Seisaku-Sho Ltd. The stretched film at the maximum draw ratio was coated with silicon oil, and the cloudiness thereof was measured by using a turbidity meter NDH 2000 manufactured by Nippon Denshoku Industries Co., Ltd.

(e) Oxygen-Permeability and Steam-Permeability

The oxygen-permeability of the film stretched at a large draw ratio was measured at a temperature of 23° C. under a relative humidity RH of 80% at the both sides, using an oxygen-permeability measuring apparatus (OX-TRAM® 2/20 manufactured by Modern Controls Inc.) in accordance with the B-method (the equal pressure method) defined in JIS K7126, and a method defined in ASTM D3985. In addition, the steam-permeability was also measured under conditions of 40° C.-90% RH in accordance with the method defined in JIS K7129. Then, the oxygen-permeability and the steam-permeability of the film with a thickness of 20 μm were calculated from the measurement results.

The results are summarized in the following Table 1.

TABLE 1

|  | Pellet | | Sheet | | | | | | |
|---|---|---|---|---|---|---|---|---|---|
|  | Composition (% by mass) | Temperature-Lowering Crystallization Peak Temperature Tc | Temperature-Lowering Crystallization Peak Temperature Tc | Main Dispersion Peak Temperature | Decrease Percentage | Elongation at Breaking Point | Film | | |
|  | PGA | PLA | (° C.) | (° C.) | (° C.) | D (%) | (%) | Oxygen-Permeability | Steam-Permeability | Cloudiness |
| Example 1 | 90 | 10 | 134 | 133 | 60 | 11 | 457 | 1.0 | 15 | 1.1 |
| Example 2 | 75 | 25 | 127 | 142 | 64 | 6 | 401 | 1.1 | 17 | 1.0 |
| Comparative Example 1 | 50 | 50 | 120 | 130 | 65 | 4 | 582 | 5.1 | 32 | 16 |

TABLE 1-continued

| | Composition (% by mass) | | Pellet Temperature-Lowering Crystallization Peak Temperature Tc (°C.) | Sheet | | | | Film | | |
|---|---|---|---|---|---|---|---|---|---|---|
| | | | | Temperature-Lowering Crystallization Peak Temperature Tc (°C.) | Main Dispersion Peak Temperature (°C.) | Decrease Percentage D (%) | Elongation at Breaking Point (%) | Oxygen-Permeability | Steam-Permeability | Cloudiness |
| | PGA | PLA | | | | | | | | |
| Comparative Example 2 | 25 | 75 | no peak | 135 | 66 | 3 | 508 | 71 | 113 | 40 |
| Comparative Example 3 | 100 | 0 | 139 | 152 | — | — | 50 | 1.0 | 10 | 1.4 |
| Comparative Example 4 | 0 | 100 | no peak | — | 68 | 1 | no breaking | 750 | 300 | 1.0 |

As shown in Table 1, the pellets of the resin composition of Examples 1 and 2 molded within the range of the present invention had the remarkably improved stretchability compared to the pellets molded from the PGA only in Comparative Example 3. The oxygen-permeability and the steam-permeability of the stretched film molded from the resin composition of Examples 1 and 2 were remarkably improved compared to those of the stretched film molded from the PLA only in Comparative Example 4, and were equal to those of the stretched film molded from the PGA only in Comparative Example 3. On the other hand, the resin compositions of Comparative Examples 1 and 2, in which the PGA and the PLA were mixed in a ratio outside of the range of the present invention, had the low oxygen- and steam-barrier properties, and the poor transparency.

From the results described above, the resin compositions of Examples 1 and 2, which were produced within the range of the present invention, had the excellent moldability, and provided the molded articles having the excellent barrier properties and transparency.

The invention claimed is:

1. An article formed from a polyglycolic acid resin composition comprising a product melt-kneaded from a polylactic acid and a polyglycolic acid, wherein
   the composition has 5 to 30% by mass of the polylactic acid;
   the composition is melt kneaded between 230° C. and 270° C.;
   both the polylactic acid and the polyglycolic acid have a mass average molecular weight Mw of 100000 to 1000000; and
   the composition has a temperature-lowering crystallization peak temperature Tc, measured by differential scanning calorimetry, of 3 to 18° C. lower than that of a polyglycolic acid only; and
   wherein the article is selected from the group consisting of films, sheets, blow-molded containers, bottles, trays, cups, lids, bag-shaped containers, and cylindrical wrapping materials.

2. A polyglycolic acid resin article molded from the polyglycolic acid resin composition according to claim 1, which has a temperature-lowering crystallization peak temperature Tc, measured by differential scanning calorimetry, of 5° C. or more lower than that of an article molded from a polyglycolic acid only.

3. The polyglycolic acid resin molded article according to claim 2, which has a decrease percentage D (%) to a main dispersion peak temperature $T_{PGA}$ in a dynamic viscoelasticity measurement of an article molded form a polylactic acid only, calculated from the following equation (A):

$$D(\%) = \frac{T_{PLA} - T_{PGA}}{T_{PLA}} \times 100 \quad (A)$$

wherein $T_{PGA}$ is a main dispersion peak temperature in the dynamic viscoelasticity measurement, of more than 4%.

4. The polyglycolic acid resin molded article according to claim 2, which has an elongation at the breaking point of 100 to 600% in a stress-strain measurement at 75° C.

5. A molded article comprising a layer produced from the polyglycolic acid resin composition according to claim 1.

* * * * *